(No Model.)
A. M. HUREL.
BOTTLE FOR MILK AND OTHER LIQUIDS.
No. 288,238. Patented Nov. 13, 1883.
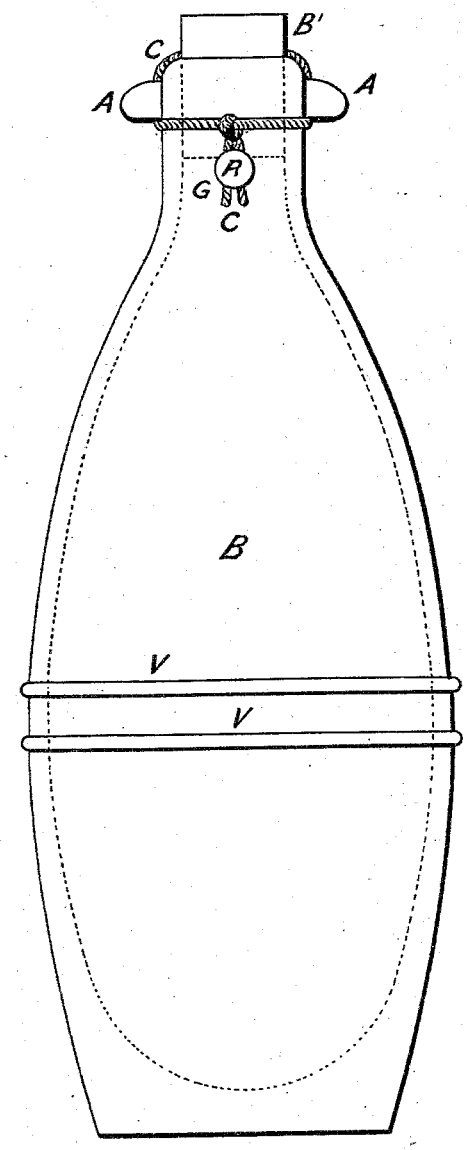
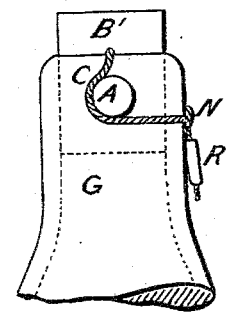
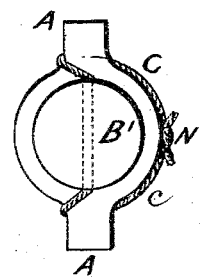
Witnesses.
Inventor.

UNITED STATES PATENT OFFICE.

ARMAND M. HUREL, OF THEILLEMENT, FRANCE.

BOTTLE FOR MILK AND OTHER LIQUIDS.

SPECIFICATION forming part of Letters Patent No. 288,238, dated November 13, 1883.

Application filed December 15, 1881. (No model.) Patented in France August 6, 1881, No. 144,205; in Italy November 20, 1881, No. 13,576; in England November 21, 1881, No. 5,090; in Belgium November 21, 1881, No. 56,259; in Austria November 25, 1881, No. 39,120; in Spain December 5, 1881, No. 2,507, and in Germany Ju.y 10, 1882, No. 18,681.

*To all whom it may concern:*

Be it known that I, ARMAND MARTIN HUREL, of Theillement, France, have invented a new and useful Improvement in Bottles for Transporting Milk and other Liquids, (for which I have obtained a patent in France bearing date August 6, A. D. 1881, No. 144,205; in Italy by Letters Patent No. 13,576, dated November 20, 1881; in England by Letters Patent No. 5,090, dated November 21, 1881; in Belgium by Letters Patent No. 56,289, dated November 21, 1881; in Austria by Letters Patent No. 39,120, dated November 25, 1881; in Spain by Letters Patent No. 2,507, dated December 5, 1881, and in Germany by Letters Patent No. 18,681, July 10, 1882,) of which the following is a specification.

My invention has for its object to produce a bottle adapted for the transport of milk and other liquids; and it consists, chiefly, in a new device for closing and sealing it.

In the accompanying drawings, Figure 1 is a front elevation of a bottle embodying my invention, while Figs. 2 and 3 show the stopper in side view and plan.

My bottle B is made ovoid in shape, to facilitate cleansing, and of greenish white transparent glass, to render the least impurity conspicuous. It is provided with a cork stopper, B', perforated from right to left for the reception of a string, C, the ends of which are passed behind two projections or ears, A A, and united in front by a knot, N, and a seal, R, of lead or other suitable material. This seal may represent the trade-mark of the sender. Rings V V are formed on the body of the bottle, to facilitate the packing of the bottle with straw, the space between the rings being intended to receive the packing-strings. The neck G of the bottle is made short and preferably with a diameter of about an inch for all sizes of bottles, to facilitate the introduction of a scrubbing-brush.

What I claim is—

The combination of a perforated stopper, B', with noses A A, and a string, C, passing through the stopper, over the mouth, and under the noses, and united at one side of the bottle-neck, for stoppering bottles, substantially as described.

In testimony that I claim the foregoing I have hereunto set my hand this 14th day of November, 1881.

A. M. HUREL.

Witnesses:
   L. D. TOUSSAINTE,
   LEON SCHMITTBUHL.